United States Patent
Konji

(10) Patent No.: US 12,200,620 B2
(45) Date of Patent: Jan. 14, 2025

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventor: Mitsuru Konji, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 409 days.

(21) Appl. No.: 17/680,046

(22) Filed: Feb. 24, 2022

(65) Prior Publication Data
US 2022/0279438 A1 Sep. 1, 2022

(30) Foreign Application Priority Data
Feb. 26, 2021 (JP) ................................. 2021-030362

(51) Int. Cl.
| | |
|---|---|
| H04W 4/00 | (2018.01) |
| H04W 8/00 | (2009.01) |
| H04W 48/16 | (2009.01) |
| H04W 48/20 | (2009.01) |

(52) U.S. Cl.
CPC ........... *H04W 48/20* (2013.01); *H04W 8/005* (2013.01); *H04W 48/16* (2013.01)

(58) Field of Classification Search
CPC ..... H04W 48/20; H04W 8/005; H04W 48/16; H04W 8/00
USPC .......................................................... 370/329
See application file for complete search history.

(56) References Cited

U.S. PATENT DOCUMENTS

| | | | |
|---|---|---|---|
| 11,550,525 B2* | 1/2023 | Tsuji | G06F 3/1236 |
| 11,609,726 B2* | 3/2023 | Caño | G06F 3/128 |
| 11,838,116 B2* | 12/2023 | Goto | H04L 63/0869 |
| 11,982,499 B2* | 5/2024 | Turney | F28F 13/12 |
| 2005/0148326 A1 | 7/2005 | Nogawa | |

(Continued)

FOREIGN PATENT DOCUMENTS

| | | | |
|---|---|---|---|
| EP | 2608625 A1 | 6/2013 | |
| JP | 2016-127545 A | 7/2016 | |
| WO | WO-2021050882 A1 * | 3/2021 | ............. B60R 11/00 |

OTHER PUBLICATIONS

Wi-Fi Easy Connect Specification Version 2.0. Wi-Fi Alliance. Dec. 14, 2020. pp. 1-226, XP055768216. Retrieved from the Internet: <URL: extension://elhekieabhbkpmcefcoobjddigjcaadp/https://www.wi-fi.org/download.php?file=/sites/default/files/private/Wi-Fi_Easy_Connect_Specification_v2.0.pdf>. Retrieved on Jan. 25, 2021.

*Primary Examiner* — Marceau Milord
(74) *Attorney, Agent, or Firm* — Canon U.S.A., Inc. IP Division

(57) ABSTRACT

An information processing apparatus includes an acquisition unit configured to acquire, via communication with a communication apparatus based on Institute of Electrical and Electronics Engineers (IEEE) 802.11 using a first protocol, predetermined information for performing communication with the communication apparatus based on IEEE 802.11 using a second protocol; and a control unit configured to perform predetermined control to control the information processing apparatus to transmit connection information, for connecting to an access point, to the communication apparatus via communication with the communication apparatus that is performed using the predetermined information based on IEEE 802.11 using the second protocol.

20 Claims, 9 Drawing Sheets

(56) References Cited

U.S. PATENT DOCUMENTS

| | | | |
|---|---|---|---|
| 2017/0208531 A1* | 7/2017 | Huang | H04W 40/16 |
| 2018/0077255 A1 | 3/2018 | Goto | |
| 2019/0303071 A1* | 10/2019 | Tsuji | H04L 63/0853 |
| 2020/0137568 A1* | 4/2020 | Takeuchi | H04W 12/08 |
| 2020/0383049 A1* | 12/2020 | Tellado | H04W 24/04 |
| 2020/0413403 A1 | 12/2020 | Umehara | |
| 2021/0306947 A1* | 9/2021 | Koizumi | G06F 1/3284 |
| 2021/0377024 A1* | 12/2021 | Shibata | H04W 12/06 |
| 2022/0232459 A1* | 7/2022 | Lee | H04W 48/20 |
| 2022/0279605 A1* | 9/2022 | Konji | H04W 12/50 |

\* cited by examiner

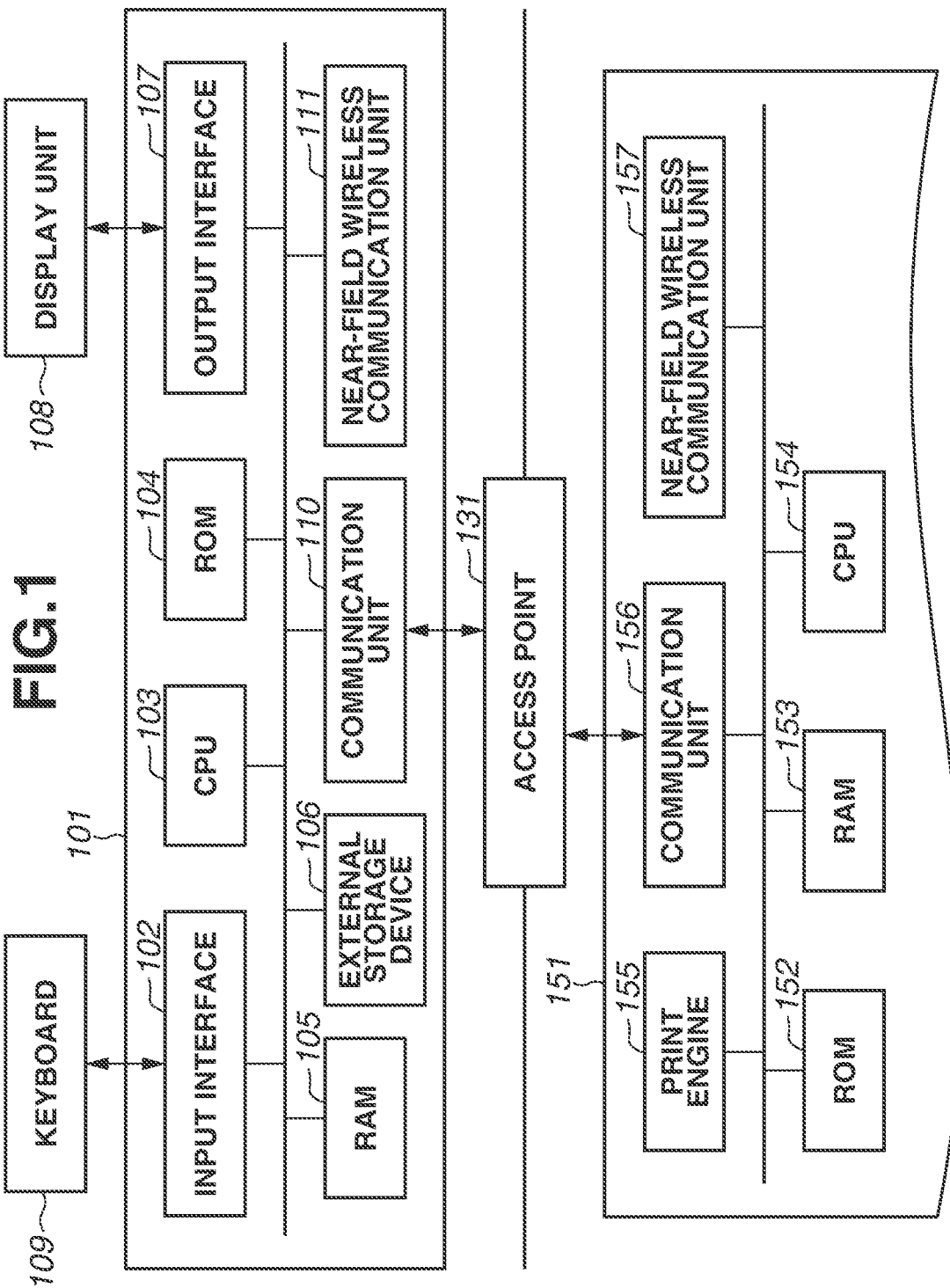

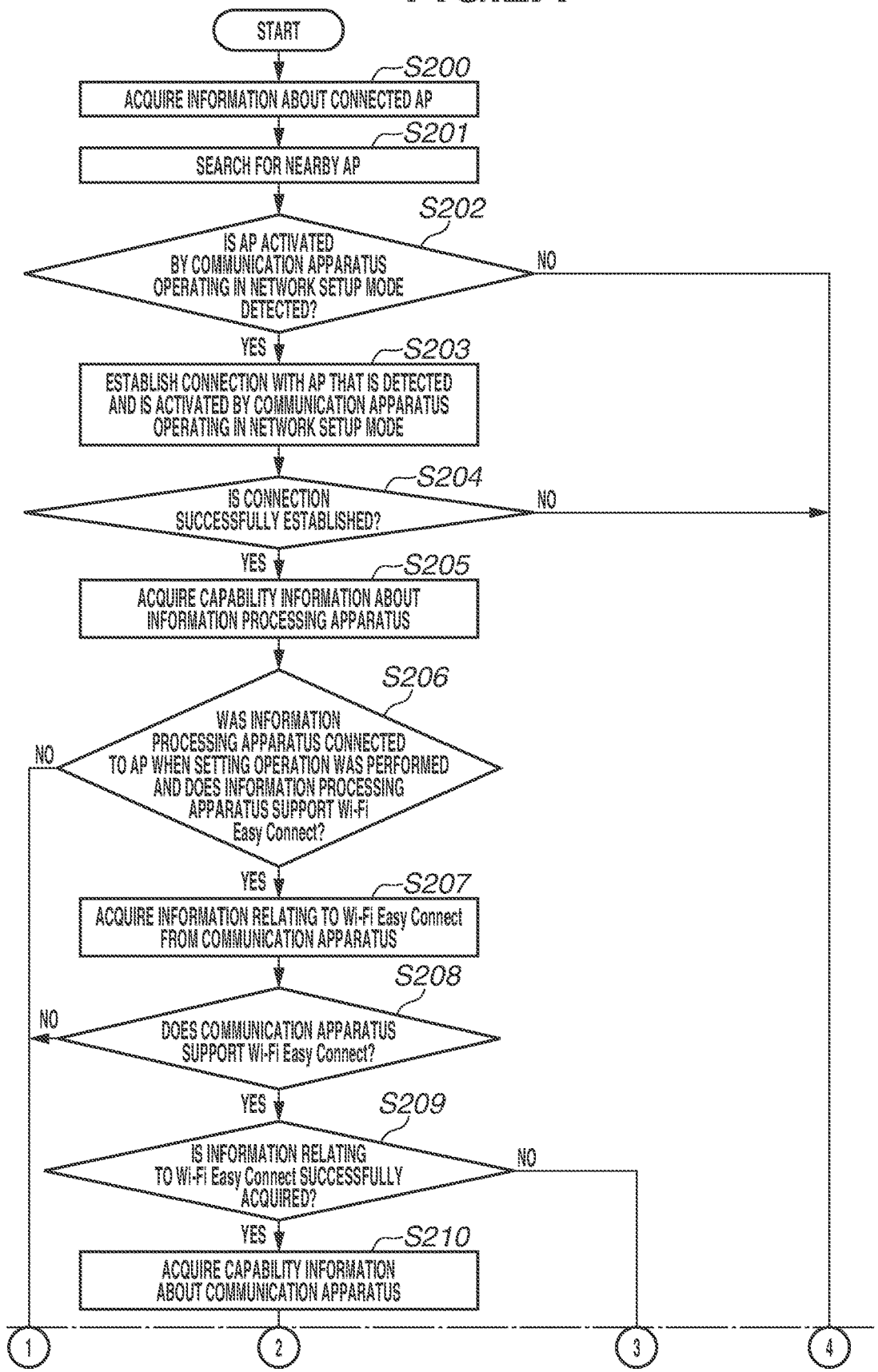

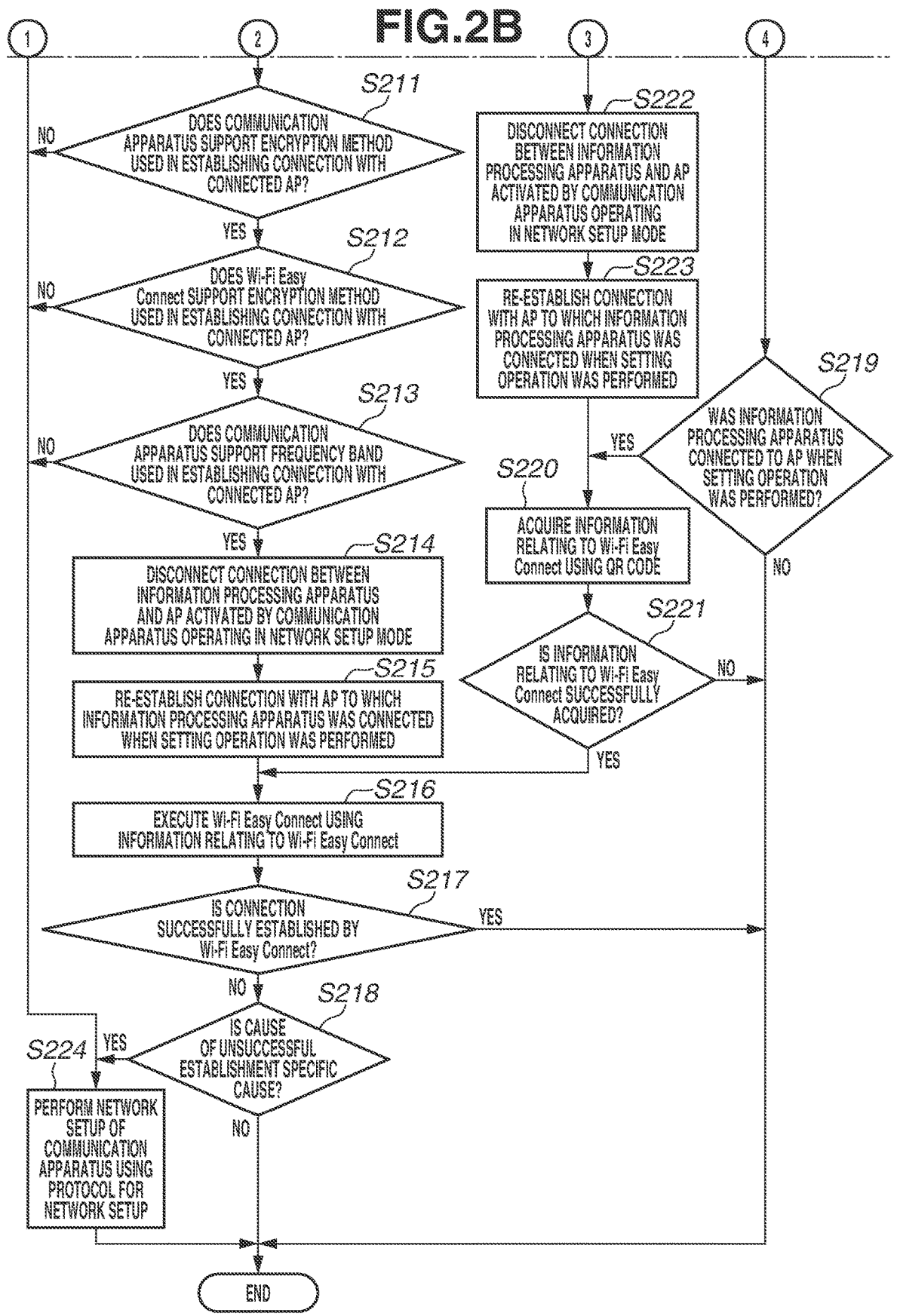

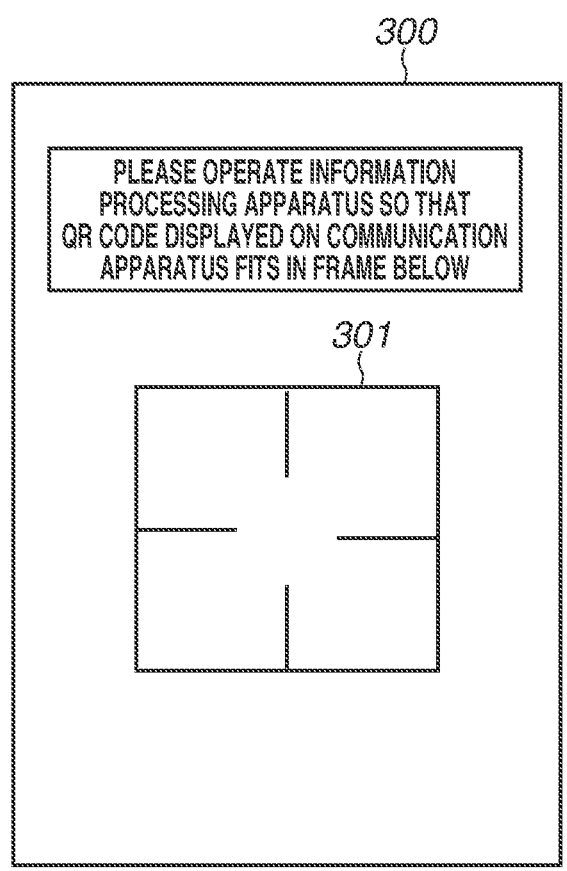

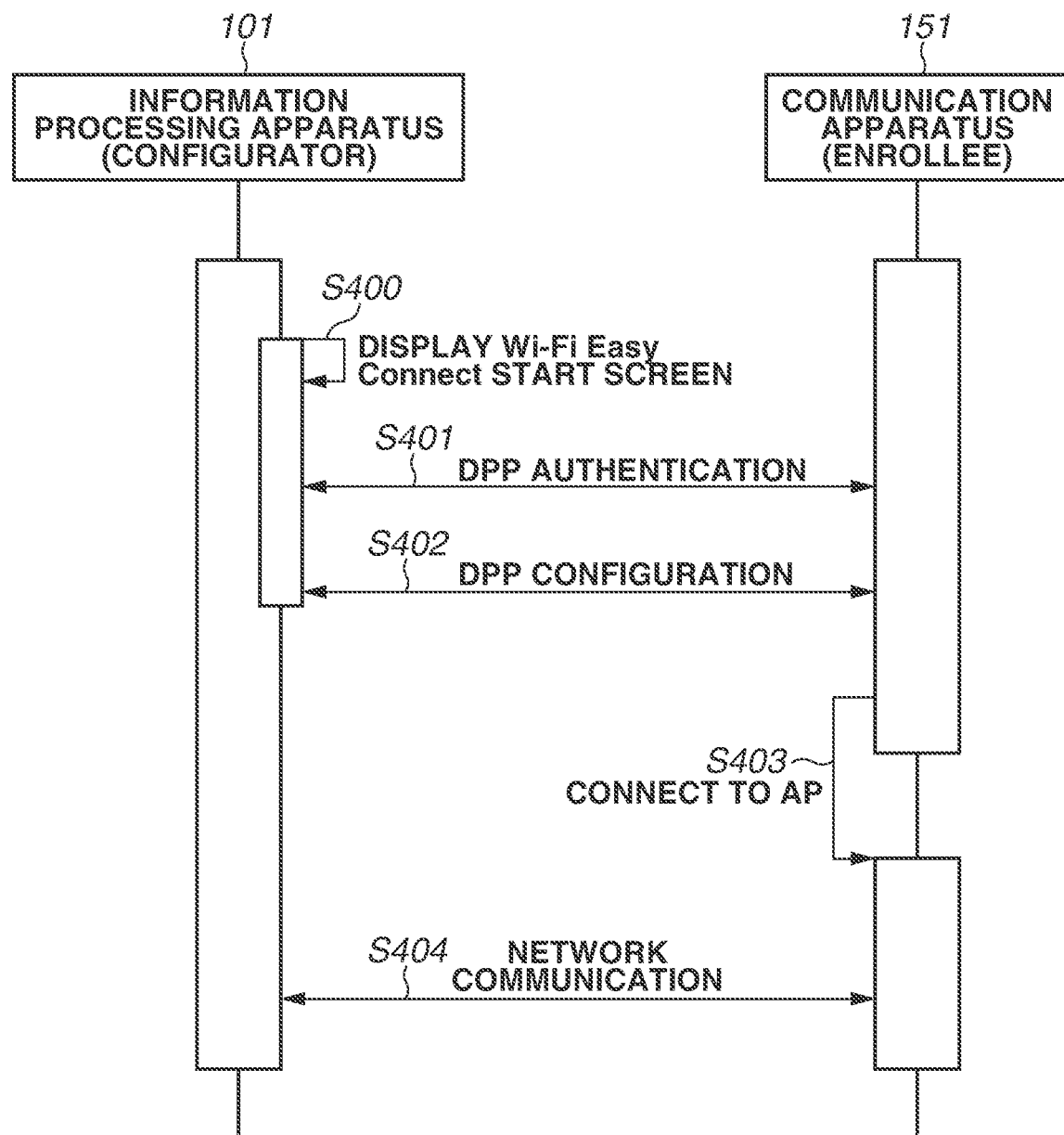

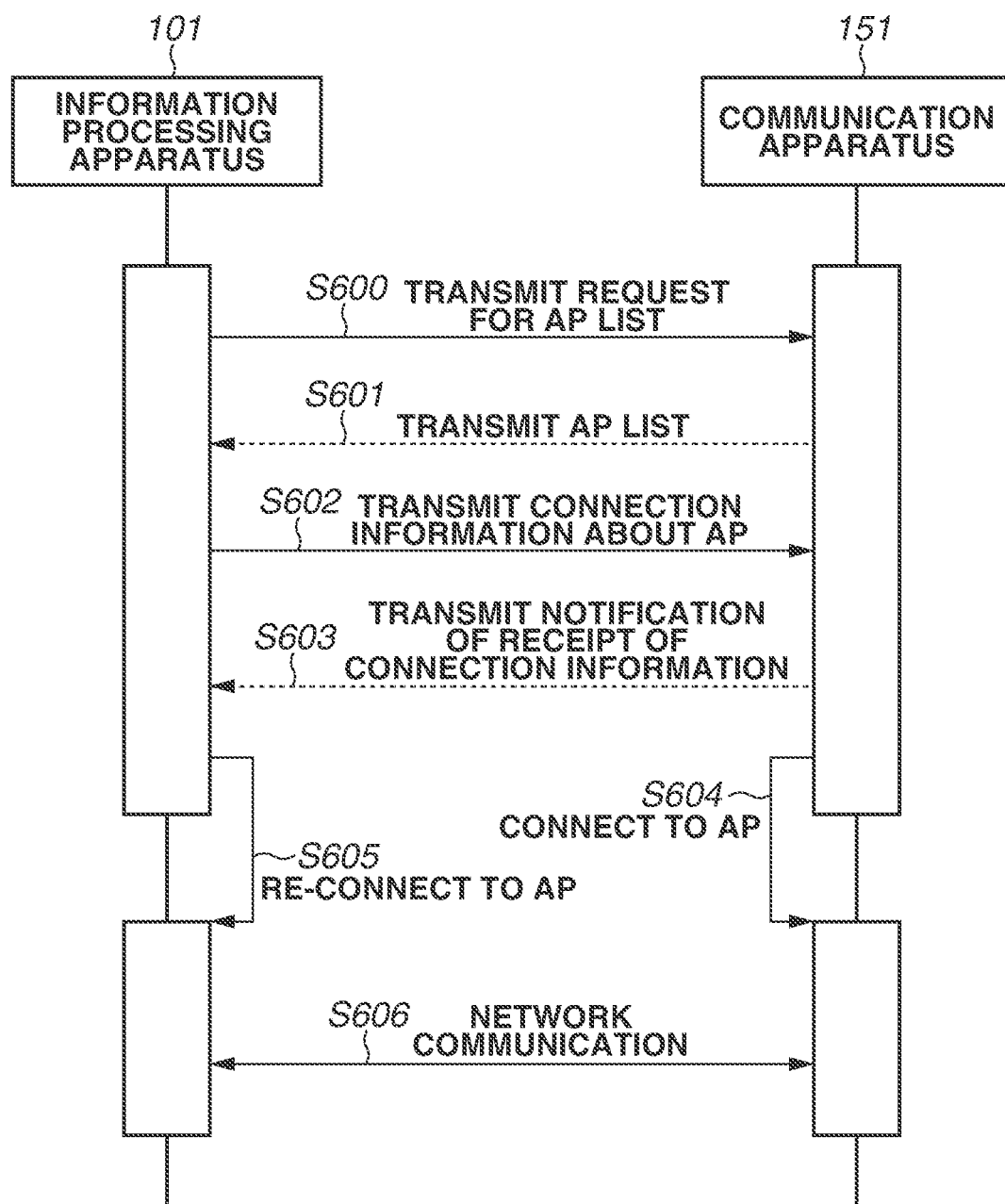

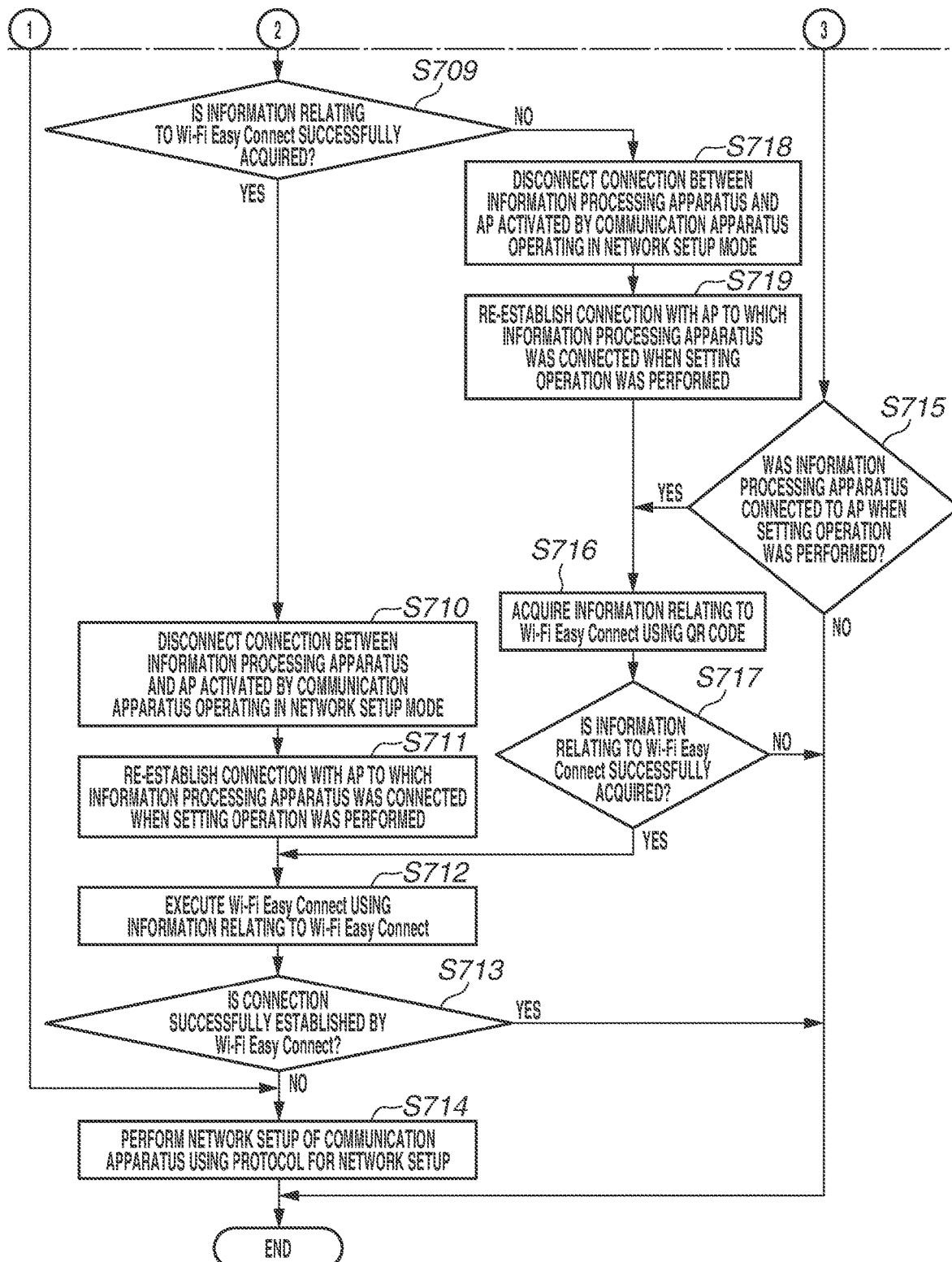

INFORMATION PROCESSING APPARATUS, CONTROL METHOD THEREOF, AND STORAGE MEDIUM

BACKGROUND OF THE INVENTION

Field of the Invention

The present invention relates to an information processing apparatus, a control method thereof, and a storage medium.

Description of the Related Art

Techniques in which an information processing apparatus such as a personal computer (PC) transmits access point information to a communication apparatus such as a printer and the communication apparatus and the external apparatus are connected together are known (e.g., Japanese Patent Application Laid-Open No. 2016-127545)

Meanwhile, a function of transmitting connection information for connecting to an access point to a communication apparatus and connecting the communication apparatus to the access point is increasingly used, and there are demands for increased convenience of the function.

SUMMARY OF THE INVENTION

The present invention is based on the above-described issue and is directed to increasing convenience of a function of connecting a communication apparatus and an access point to each other.

According to an aspect of the present invention, an information processing apparatus includes an acquisition unit configured to acquire, via communication with a communication apparatus based on Institute of Electrical and Electronics Engineers (IEEE) 802.11 using a first protocol, predetermined information for performing communication with the communication apparatus based on IEEE 802.11 using a second protocol; and a control unit configured to perform predetermined control to control the information processing apparatus to transmit connection information for connecting to an access point to the communication apparatus via communication with the communication apparatus that is performed using the predetermined information based on IEEE 802.11 using the second protocol.

Further features of the present invention will become apparent from the following description of embodiments with reference to the attached drawings.

BRIEF DESCRIPTION OF THE DRAWINGS

FIG. 1 is a diagram illustrating a configuration of an information processing apparatus and a communication apparatus.

FIGS. 2A and 2B are flowcharts illustrating a process performed by the information processing apparatus in network setup processing.

FIG. 3 illustrates an example of a screen for imaging a quick response code (QR Code®) displayed by a settings application.

FIG. 4 is a sequence diagram illustrating a process performed by the information processing apparatus and the communication apparatus.

FIG. 6 is a sequence diagram illustrating a process performed by the information processing apparatus and the communication apparatus.

FIGS. 7A and 7B are flowcharts illustrating a process performed by the information processing apparatus in network setup processing.

DESCRIPTION OF THE EMBODIMENTS

Figure 5:
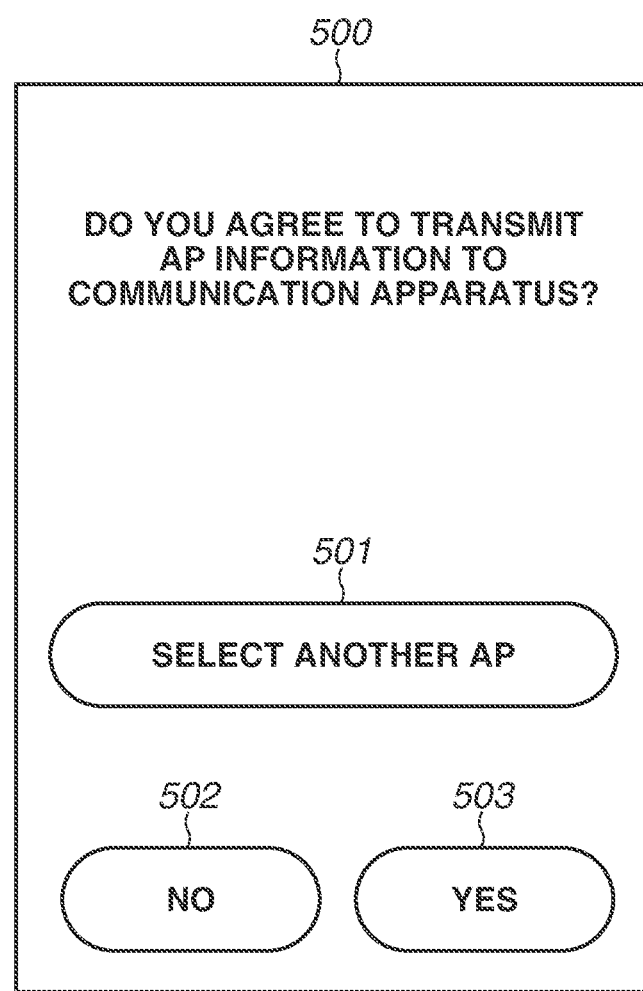
FIG. 5 illustrates an example of a Wi-Fi Easy Connect™ start screen.

Various embodiments of the present invention will be described below with reference to the drawings. It should be understood that changes and modifications made to the below-described embodiments as needed based on ordinary skill in the art without departing from the invention are also encompassed within the scope of the present invention. Each of the embodiments of the present invention described below can be implemented solely or as a combination of a plurality of the embodiments or features thereof where necessary or where the combination of elements or features from individual embodiments in a single embodiment is beneficial.

A first embodiment will be described below. An information processing apparatus and a communication apparatus of a communication system according to the present embodiment will be described below. While a smartphone is described as an example of an information processing apparatus according to the present embodiment, the information processing apparatus according to the present embodiment is not limited to the smartphone. Various apparatuses such as a mobile terminal, a personal computer (PC), a tablet terminal, a personal digital assistant (PDA), and a digital camera are applicable as the information processing apparatus. Further, while a printer is described as an example of a communication apparatus according to the present embodiment, the communication apparatus according to the present embodiment is not limited to the printer, and various apparatuses capable of wirelessly communicating with the information processing apparatus are applicable. Examples of applicable printers are inkjet printers, full-color laser beam printers, and monochrome printers. Further, not only printers but also other apparatuses such as copying machines, facsimile apparatuses, mobile terminals, smartphones, laptop PCs, tablet terminals, PDAs, digital cameras, music reproduction devices, televisions, and smart speakers are applicable. Other multi-functional peripherals that include a plurality of functions such as a copy function, a facsimile function, and a print function are also applicable.

Further, according to the present embodiment, an information processing apparatus that supports a function referred to as Wi-Fi Easy Connect can perform the function. Wi-Fi Easy Connect is the function of performing a network setup of another apparatus using Device Provisioning Protocol (hereinafter, "DPP") developed by Wi-Fi Alliance®. The network setup of another apparatus is specifically the processing of connecting the other apparatus to an access point that configures a network. In Wi-Fi Easy Connect, an apparatus operating as the role "Configurator" (hereinafter, the apparatus will be referred to as "Configurator apparatus") and an apparatus operating as the role "Enrollee" (hereinafter, the apparatus will be referred to as "Enrollee apparatus") communicate with each other. The Configurator apparatus acquires Bootstrapping information from the Enrollee apparatus. The Bootstrapping information includes, for example, identification information (media access control (MAC) address) about the Enrollee apparatus and public key information for use in performing secure communication with the Enrollee apparatus. In the present embodiment, the Bootstrapping information will be referred to as "information relating to Wi-Fi Easy Connect". Other information can also be treated as the information relating to Wi-Fi Easy Connect. The Configurator apparatus performs wireless communication with the Enrollee apparatus using the acquired Bootstrapping information. Specifically, for example, the Configurator apparatus encrypts a protocol key using a public key included in the Bootstrapping information and transmits the encrypted protocol key to the Enrollee apparatus. Then, the Configurator apparatus encrypts a symmetric key based on the encrypted protocol key and transmits information encrypted using the symmetric key to the Enrollee apparatus. The information to be transmitted herein is specifically, for example, connection information for connecting to an access point. Then, the Enrollee apparatus establishes a wireless connection with the access point using the connection information received from the Configurator apparatus. In network setup processing using Wi-Fi Easy Connect according to the present embodiment, an information processing apparatus that supports Wi-Fi Easy Connect operates as a Configurator apparatus, and a communication apparatus that supports Wi-Fi Easy Connect operates as an Enrollee apparatus.

First, a configuration of an information processing apparatus and a communication apparatus capable of communicating with the information processing apparatus according to the present embodiment will be described below with reference to a block diagram illustrated in FIG. 1. Further, while the following configuration is described as an example according to the present embodiment, the present embodiment is applicable to an apparatus capable of communicating with a communication apparatus, and functions are not limited to those illustrated in FIG. 1.

An information processing apparatus 101 is an information processing apparatus according to the present embodiment. The information processing apparatus 101 includes an input interface 102, a central processing unit (CPU) 103, a read-only memory (ROM) 104, a random access memory (RAM) 105, an external storage device 106, an output interface 107, a display unit 108, a communication unit 110, and a near-field wireless communication unit 111. The CPU 103, the ROM 104, and the RAM 105 form a computer of the information processing apparatus 101.

The input interface 102 is an interface for receiving data input and operation instructions from a user based on an operation on an operation unit such as a keyboard 109. The operation unit can be a physical keyboard and a physical button or can be a software keyboard and a software button displayed on the display unit 108. Specifically, the input interface 102 can receive user input via the display unit 108.

The CPU 103 is a system control unit and controls the entire information processing apparatus 101.

The ROM 104 stores fixed data such as control programs to be executed by the CPU 103, a data table, and an embedded operating system (hereinafter, "OS") program. According to the present embodiment, a control program stored in the ROM 104 controls execution of software such as scheduling, task switching, and interrupting processing under management by the embedded OS stored in the ROM 104.

The RAM 105 consists of a static random access memory (SRAM) for which a backup power supply is needed. The RAM 105 retains data stored therein with a primary battery (not illustrated) for data backup, so that important data such as program control variables is stored without being lost. Further, the RAM 105 includes a memory area for storing settings information about the information processing apparatus 101 and management data on the information processing apparatus 101. Further, the RAM 105 is also used as a main memory and a work memory of the CPU 103.

The external storage device 106 stores an application program (hereinafter, "settings application") for performing a network setup of a communication apparatus 151 and a printing information generation program for generating printing information interpretable by the communication apparatus 151. The settings application is an application program for configuring settings of an access point that is a connection destination of the communication apparatus 151 using Wi-Fi Easy Connect. The settings application can include a function other than the network setup function. For example, the settings application can include a function of causing the communication apparatus 151 to perform printing, a function of causing the communication apparatus 151 to scan a set document, and a function of checking a state of the communication apparatus 151. The settings application is installed, for example, from an external server via Internet communication via the communication unit 110 and is thereby stored in the external storage device 106. Further, the external storage device 106 stores various programs such as an information transmission/reception control program for controlling information transmission and reception to and from the communication apparatus 151 connected via the communication unit 110 and stores various types of information for use in the programs.

The output interface 107 is an interface for controlling data display and notification of the state of the information processing apparatus 101 by the display unit 108.

The display unit 108 includes a light emitting diode (LED) and a liquid crystal display (LCD). The display unit 108 displays data and provides a notification of the state of the information processing apparatus 101.

The communication unit 110 is a configuration for connecting to an apparatus such as the communication apparatus 151 and an access point 131 to perform data communication. For example, the communication unit 110 is connectable to an internal access point (not illustrated) of the communication apparatus 151. The communication unit 110 and the internal access point of the communication apparatus 151 are connected together to thereby enable the information processing apparatus 101 and the communication apparatus 151 to communicate with each other. The communication unit 110 can directly communicate with the communication apparatus 151 via wireless communication or can communicate with the communication apparatus 151 via an external apparatus situated outside the information processing apparatus 101 and the communication apparatus 151. The external apparatus includes an external access point (access point 131) situated outside the information processing apparatus 101 and the communication apparatus 151 and an apparatus that is not an access point but is capable of relaying communication. According to the present embodiment, the communication unit 110 uses a Wi-Fi® communication standard based on the Institute of Electrical and Electronics Engineers (IEEE) 802.11 series as a wireless communication method. Wi-Fi Easy Connect described above is performed through communication by the communication unit 110. Further, the access point 131 is, for example, a device such as a wireless local area network (wireless LAN) router. According to the present embodiment, a method in which the information processing apparatus 101 and the communication apparatus 151 directly connect to each other without an external access point is referred to as "direct connection method", whereas a method in which the information processing apparatus 101 and the communication apparatus 151 connect to each other via an external access point is referred to as "infrastructure connection method".

The near-field wireless communication unit 111 is a configuration for establishing a near-field wireless connection with an apparatus such as the communication apparatus 151 to perform data communication. The near-field wireless communication unit 111 performs communication using a communication method different from that of the communication unit 110. The near-field wireless communication unit 111 is connectable to, for example, a near-field wireless communication unit 157 in the communication apparatus 151. Examples of communication methods are near-field communication (NFC), Bluetooth® Classic, Bluetooth® Low Energy, and Wi-Fi Aware™.

According to the present embodiment, the OS of the information processing apparatus 101 performs Wi-Fi Easy Connect based on an instruction to perform network setup processing from the settings application.

The communication apparatus 151 is a communication apparatus according to the present embodiment. The communication apparatus 151 includes a ROM 152, a RAM 153, a CPU 154, a print engine 155, a communication unit 156, and the near-field wireless communication unit 157. The ROM 152, the RAM 153, and the CPU 154 form a computer of the communication apparatus 151.

The communication unit 156 includes an access point for connecting to an apparatus such as the information processing apparatus 101 as an internal access point of the communication apparatus 151. The access point is connectable to the communication unit 110 of the information processing apparatus 101. The communication unit 156 activates the access point so that the communication apparatus 151 operates as an access point. The communication unit 156 can wirelessly connect to the information processing apparatus 101 directly or via the access point 131. According to the present embodiment, the communication unit 156 uses a communication method based on the IEEE 802.11 series as a wireless communication method. Further, Wi-Fi® hereinafter refers to a communication standard based on the IEEE 802.11 series. Further, in a case where the communication apparatus 151 supports Wi-Fi Easy Connect, Wi-Fi Easy Connect described above is performed through communication by the communication unit 156. Further, the communication unit 156 can include hardware configured to function as an access point or can operate as an access point by software configured to cause the communication unit 156 to function as an access point.

The communication apparatus 151 according to the present embodiment is operable in an infrastructure mode and a peer-to-peer (P2P) mode as a mode for performing communication using the communication unit 156.

The infrastructure mode is a form of communication with another apparatus such as the information processing apparatus 101 by the communication apparatus 151 via an external apparatus (e.g., access point 131) forming a network. A connection established with an external access point by the communication apparatus 151 operating in the infrastructure mode will be referred to as "infrastructure connection". According to the present embodiment, the communication apparatus 151 operates as a child apparatus and the external access point operates as a parent apparatus in the infrastructure connection. According to the present embodiment, the parent apparatus is an apparatus that determines a communication channel for use in a network to which the parent apparatus belongs, and the child apparatus is an apparatus that uses the communication channel determined by the parent apparatus and does not determine a communication channel for use in a network to which the child apparatus belongs.

The P2P mode is a form of direct communication with another apparatus such as the information processing apparatus 101 by the communication apparatus 151 without an external apparatus forming a network. According to the present embodiment, the P2P mode includes an access point (AP) mode in which the communication apparatus 151 operates as an access point. Connection information (service set identifier (SSID), password) about the access point that is activated in the communication apparatus 151 in the AP mode can be set as desired by a user. The P2P mode can include, for example, a Wi-Fi Direct® mode in which the communication apparatus 151 performs Wi-Fi Direct communication. Which of a plurality of devices supporting Wi-Fi Direct is to operate as the parent apparatus is determined through, for example, a group owner negotiation sequence. The parent apparatus can be determined without performing the group owner negotiation. An apparatus that supports Wi-Fi Direct and plays the role as the parent apparatus is especially referred to as "group owner". A direct connection established with another apparatus by the communication apparatus 151 operating in the P2P mode is referred to as "direct connection". According to the present embodiment, the communication apparatus 151 operates as the parent apparatus and another apparatus operates as the child apparatus in the direct connection.

Further, according to the present embodiment, the communication apparatus 151 is operable in a network setup mode. The network setup mode is a mode for performing a network setup of the communication apparatus 151 based on a predetermined operation received from a user. In a case where the communication apparatus 151 operates in the network setup mode, the communication apparatus 151 uses the communication unit 156 to operate as an active access point for setup while operating in the network setup mode. The access point for setup is an access point different from an access point that is activated in the AP mode. Further, an SSID of the access point for setup contains a predetermined character string recognizable by the settings application of the information processing apparatus 101. Further, the access point for setup is an access point that does not require a password to connect to the access point. Further, the communication apparatus 151 operating in the network setup mode uses a predetermined communication protocol (communication protocol for setup) to communicate with the information processing apparatus 101 connected to the access point for setup. Specifically, the communication protocol for setup is, for example, Simple Network Management Protocol (SNMP). Since the access point for setup is an access point that does not require a password as described above, leaving the access point in the activated state for a long time increases the possibility of a connection request from an unintended apparatus. Thus, when a predetermined time passes after the communication apparatus 151 starts operating in the network setup mode, the communication apparatus 151 stops operating in the network setup mode and deactivates the access point for setup. The access point for setup can be an access point that requires a password. In this case, a password for use in connecting to the access point for setup is a fixed password that the settings application holds in advance (a fixed password that a user cannot change).

The near-field wireless communication unit 157 is configured to establish a near-field wireless connection with an apparatus such as the information processing apparatus 101.

For example, the near-field wireless communication unit 157 is connectable to the near-field wireless communication unit 111 in the information processing apparatus 101. Examples of communication methods are NFC, Bluetooth Classic, Bluetooth Low Energy, and Wi-Fi Aware.

The RAM 153 consists of an SRAM for which a backup power supply is needed. The RAM 153 retains data stored therein with a primary battery (not illustrated) for data backup, so that important data such as program control variables is stored without being lost. Further, the RAM 153 includes a memory area for storing settings information about the communication apparatus 151 and management data on the communication apparatus 151. Further, the RAM 153 is also used as a main memory and a work memory of the CPU 154 and stores a reception buffer and various types of information. The reception buffer temporarily stores printing information received from the information processing apparatus 101.

The ROM 152 stores fixed data such as control programs to be executed by the CPU 154, a data table, and an OS program. According to the present embodiment, a control program stored in the ROM 152 controls execution of software such as scheduling, task switching, and interrupting processing under management by an embedded OS stored in the ROM 152.

The CPU 154 is a system control unit and controls the entire communication apparatus 151.

The print engine 155 forms an image on a recording medium such as paper by applying a recording agent such as an ink to the recording medium based on information stored in the RAM 153 and a print job received from the information processing apparatus 101 and outputs the printing result. Since a print job transmitted from the information processing apparatus 101 generally has a large volume, it is desirable to use a communication method for high-speed communication in communicating a print job. Thus, the communication apparatus 151 receives a print job via the communication unit 156 capable of performing communication at higher speed than the near-field wireless communication unit 157.

A memory such as an external hard disk drive (external HDD) or a Secure Digital (SD) card can be mounted as an optional device on the communication apparatus 151, and information stored in the communication apparatus 151 can be stored in the memory.

FIG. 2 is a flowchart illustrating a process performed by the information processing apparatus 101 in network setup processing according to the present embodiment. The flowchart illustrated in FIG. 2 is realized by, for example, the CPU 103 by reading the settings application stored in the ROM 104 or the external storage device 106 to the RAM 105 and executing the read settings application. Further, the flowchart illustrated in FIG. 2 is started if a predetermined operation (hereinafter, "setting operation") for network setup is performed on a screen displayed by the settings application.

First, in step S200, the CPU 103 acquires information about an access point (hereinafter, "connected AP") to which the information processing apparatus 101 was wirelessly connected via Wi-Fi at least when the setting operation was performed. According to the present embodiment, the information processing apparatus 101 does not change a connection destination access point after the setting operation is performed, so that the access point is also an access point to which the information processing apparatus 101 is currently connected in step S200. The information includes information (SSID, information indicating an encryption method) for connecting to the access point to which the information processing apparatus 101 is wirelessly connected via Wi-Fi. The acquired information is stored in a predetermined storage area of the memory of the information processing apparatus 101. The foregoing processing of step S200 is skipped in a case where the information processing apparatus 101 was not connected to an access point via Wi-Fi when the setting operation was performed.

Next, in step S201, the CPU 103 instructs the OS of the information processing apparatus 101 to search for an access point near the information processing apparatus 101, and the settings application acquires the search result.

Next, in step S202, the CPU 103 determines whether the search result acquired in step S201 includes an access point activated by the communication apparatus 151 operating in the network setup mode. As described above, according to the present embodiment, an SSID of an access point activated by the communication apparatus 151 operating in the network setup mode contains a predetermined character string recognized in advance by the settings application. Thus, in the determination, the CPU 103 specifically determines whether the search result acquired in step S201 includes an access point having an SSID containing the predetermined character string. In a case where the CPU 103 determines that the search result acquired in step S201 includes an access point activated by the communication apparatus 151 operating in the network setup mode (YES in step S202), the processing proceeds to step S203. On the other hand, in a case where the CPU 103 determines that the search result acquired in step S201 does not include an access point activated by the communication apparatus 151 operating in the network setup mode (NO in step S202), the processing proceeds to step S219.

In step S203, the CPU 103 attempts to establish a Wi-Fi connection between the information processing apparatus 101 and the access point that is included in the search result and is activated by the communication apparatus 151 operating in the network setup mode. This Wi-Fi connection corresponds to a Wi-Fi connection between the communication apparatus 151 operating in the network setup mode and the information processing apparatus 101.

Next, in step S204, the CPU 103 determines whether the Wi-Fi connection is successfully established in step S203. In a case where the CPU 103 determines that the Wi-Fi connection is successfully established in step S203 (YES in step S204), the processing proceeds to step S205. On the other hand, in a case where the CPU 103 determines that the Wi-Fi connection is not successfully established in step S203 (NO in step S204), the processing proceeds to step S219.

In step S205, the CPU 103 acquires capability information about the information processing apparatus 101 from the OS. According to the present embodiment, the capability information contains information indicating whether the information processing apparatus 101 supports Wi-Fi Easy Connect. The content of the capability information varies depending on the model and model number of the information processing apparatus 101.

Next, in step S206, the CPU 103 determines whether the information processing apparatus 101 was connected to the access point via Wi-Fi when the setting operation was performed and whether the information processing apparatus 101 supports Wi-Fi Easy Connect. In this step, for example, in a case where the information processing apparatus 101 was not connected to the access point via Wi-Fi when the setting operation was performed, the determination result is "NO". Further, for example, in a case where the information processing apparatus 101 was connected to the access point via Wi-Fi when the setting operation was performed but the information processing apparatus 101 does not support Wi-Fi Easy Connect, the determination result is "NO". Whether the information processing apparatus 101 was connected to the access point via Wi-Fi when the setting operation was performed is determined based on whether information about the connected AP is stored in the predetermined storage area. Further, whether the information processing apparatus 101 supports Wi-Fi Easy Connect is determined based on the content of the capability information acquired in step S205. In a case where the CPU 103 determines that the information processing apparatus 101 was connected to the access point via Wi-Fi when the setting operation was performed and the information processing apparatus 101 supports Wi-Fi Easy Connect (YES in step S206), the processing proceeds to step S207. On the other hand, in a case where the CPU 103 determines that the information processing apparatus 101 was not connected to the access point via Wi-Fi when the setting operation was performed or determines that the information processing apparatus 101 was connected to the access point via Wi-Fi when the setting operation was performed but the information processing apparatus 101 does not support Wi-Fi Easy Connect (NO in step S206), the processing proceeds to step S224.

In step S207, the CPU 103 attempts to acquire various types of information from the communication apparatus 151 via the Wi-Fi connection between the information processing apparatus 101 and the access point activated by the communication apparatus 151 operating in the network setup mode. As described above, the communication protocol for setup is used in communication via the Wi-Fi connection between the information processing apparatus 101 and the access point activated by the communication apparatus 151 operating in the network setup mode. Further, the acquired information includes, for example, the information relating to Wi-Fi Easy Connect and information about whether the communication apparatus 151 supports Wi-Fi Easy Connect. In a case where the communication apparatus 151 does not support Wi-Fi Easy Connect, information indicating that the communication apparatus 151 does not support Wi-Fi Easy Connect is acquired, and the information relating to Wi-Fi Easy Connect is not acquired. Further, in a case where the communication apparatus 151 does not support Wi-Fi Easy Connect, both the information relating to Wi-Fi Easy Connect and the information about whether the communication apparatus 151 supports Wi-Fi Easy Connect may not be acquired. Normally the information relating to Wi-Fi Easy Connect can be acquired as follows. Specifically, the communication apparatus 151 displays a QR code corresponding to the information relating to Wi-Fi Easy Connect on a display unit, and the information processing apparatus 101 scans the displayed QR code using a camera unit to acquire the information relating to Wi-Fi Easy Connect. According to the present embodiment, however, the information relating to Wi-Fi Easy Connect is acquired via the Wi-Fi connection between the information processing apparatus 101 and the access point activated by the communication apparatus 151 operating in the network setup mode. With this form, the information processing apparatus 101 can acquire the information relating to Wi-Fi Easy Connect even in a case where the communication apparatus 151 does not include a display unit for displaying QR codes or the information processing apparatus 101 does not include a camera unit for scanning QR codes.

Next, in step S208, the CPU 103 determines whether the communication apparatus 151 supports Wi-Fi Easy Connect based on the information acquired in step S207. In a case where the information indicating that the communication apparatus 151 supports Wi-Fi Easy Connect is acquired, the CPU 103 determines that the communication apparatus 151 supports Wi-Fi Easy Connect. In a case where the information indicating that the communication apparatus 151 supports Wi-Fi Easy Connect is not acquired, the CPU 103 determines that the communication apparatus 151 does not support Wi-Fi Easy Connect. In a case where the CPU 103 determines that the communication apparatus 151 supports Wi-Fi Easy Connect (YES in step S208), the processing proceeds to step S209. On the other hand, in a case where the CPU 103 determines that the communication apparatus 151 does not support Wi-Fi Easy Connect (NO in step S208), the processing proceeds to step S224. In a case where information is not acquired in step S207, the determination in step S208 is NO.

Next, in step S209, the CPU 103 determines whether the information relating to Wi-Fi Easy Connect is successfully acquired from the communication apparatus 151 in step S207. In a case where the CPU 103 determines that the information relating to Wi-Fi Easy Connect is successfully acquired from the communication apparatus 151 in step S207 (YES in step S209), the processing proceeds to step S210. On the other hand, in a case where the CPU 103 determines that the information relating to Wi-Fi Easy Connect is not successfully acquired from the communication apparatus 151 in step S207 (NO in step S209), the processing proceeds to step S222. An example of the latter case (NO in step S209) is a case where the information indicating that the communication apparatus 151 supports Wi-Fi Easy Connect is successfully acquired but the information relating to Wi-Fi Easy Connect is not successfully acquired due to a communication error.

In step S210, the CPU 103 acquires capability information about the communication apparatus 151 via the Wi-Fi connection between the information processing apparatus 101 and the access point activated by the communication apparatus 151 operating in the network setup mode. According to the present embodiment, the capability information about the communication apparatus 151 includes information indicating encryption methods supported by the communication apparatus 151 and information indicating frequency bands supported by the communication apparatus 151. Examples of encryption methods supported by the communication apparatus 151 are Wi-Fi Protected Access® (WPA™), Wi-Fi Protected Access® 2 (WPA2™), and Wi-Fi Protected Access® 3 (WPA3™). Further, the information indicating frequency bands supported by the communication apparatus 151 can be information indicating communication channels corresponding to frequency bands supported by the communication apparatus 151. The processing of step S210 can be skipped in a below-described form that does not include the determination about encryption methods supported by the communication apparatus 151 and the determination about frequency bands supported by the communication apparatus 151. The capability information can be included in advance in the settings application. Specifically, the CPU 103 can identify capability information corresponding to the communication apparatus 151 from the plurality of capability information prepared for each type and model number of the communication apparatuses and included in the settings application, and acquire the identified capability information from the settings application.

Next, in step S211, the CPU 103 determines whether the encryption method used in establishing the connection with the connected AP is an encryption method supported by the communication apparatus 151 based on the capability information acquired in step S210. According to the present embodiment, the encryption methods supported by the communication apparatus 151 are WPA, WPA2, and WPA3, and an encryption method that is not supported by the communication apparatus 151 is Wired Equivalent Privacy (WEP). In a case where the CPU 103 determines that the encryption method used in establishing the connection with the connected AP is an encryption method that is supported by the communication apparatus 151 (YES in step S211), the processing proceeds to step S212. On the other hand, in a case where the CPU 103 determines that the encryption method used in establishing the connection with the connected AP is an encryption method that is not supported by the communication apparatus 151 (NO in step S211), the processing proceeds to step S224. This determination can be performed at another timing. Specifically, for example, this determination can be performed after the CPU 103 determines that the Wi-Fi connection is successfully established in step S203 (YES in step S204), and the processing can proceed to step S205 in a case where the CPU 103 determines that the encryption method used in establishing the connection with the connected AP is an encryption method that is supported by the communication apparatus 151 (YES in step S211), or the processing can proceed to step S224 in a case where the CPU 103 determines that the encryption method used in establishing the connection with the connected AP is an encryption method that is not supported by the communication apparatus 151 (NO in step S211).

Next, in step S212, the CPU 103 determines whether the encryption method used in establishing the connection with the connected AP is an encryption method supported by Wi-Fi Easy Connect (an encryption method supported by DPP). Examples of an encryption method that is supported by Wi-Fi Easy Connect are WPA2 and WPA3, and examples of an encryption method that is not supported by Wi-Fi Easy Connect are WPA and WEP. The CPU 103 can determine an encryption method supported by Wi-Fi Easy Connect based on information stored in advance in the settings application or based on information acquired from the communication apparatus 151. In a case where the CPU 103 determines that the encryption method used in establishing the connection with the connected AP is an encryption method supported by Wi-Fi Easy Connect (YES in step S212), the processing proceeds to step S213. On the other hand, in a case where the CPU 103 determines that the encryption method used in establishing the connection with the connected AP is not an encryption method supported by Wi-Fi Easy Connect (NO in step S212), the processing proceeds to step S224.

Next, in step S213, the CPU 103 determines whether a frequency band used in establishing the connection with the connected AP is a frequency band supported by the communication apparatus 151 based on the capability information acquired in step S210. According to the present embodiment, there are a type of the communication apparatus 151 that supports both 2.4-GHz and 5-GHz frequency bands and another type of the communication apparatus 151 that supports the 2.4-GHz frequency band but does not support the 5-GHz frequency band.

The communication apparatus 151 cannot connect to an access point through a frequency band that the communication apparatus 151 does not support. Thus, for example, in a case where the frequency band used in establishing the connection with the connected AP is the 5-GHz frequency band and the communication apparatus 151 does not support the 5-GHz frequency band, the determination result is "NO". In a case where the CPU 103 determines that the frequency band used in establishing the connection with the connected AP is a frequency band supported by the communication apparatus 151 (YES in step S213), the processing proceeds to step S214. On the other hand, in a case where the CPU 103 determines that the frequency band used in establishing the connection with the connected AP is not a frequency band supported by the communication apparatus 151 (NO in step S213), the processing proceeds to step S224.

In step S214, the CPU 103 disconnects the Wi-Fi connection between the information processing apparatus 101 and the access point activated by the communication apparatus 151 operating in the network setup mode.

Next, in step S215, the CPU 103 re-establishes a connection between the information processing apparatus 101 and the access point to which the information processing apparatus 101 was connected via Wi-Fi when the setting operation was performed. According to Wi-Fi Easy Connect, information about an access point to which the information processing apparatus 101 is connected when Wi-Fi Easy Connect is executed is transmitted. Thus, the processing of step S215 is performed to prepare for execution of Wi-Fi Easy Connect in step S216.

Next, in step S216, the CPU 103 executes Wi-Fi Easy Connect using the acquired information relating to Wi-Fi Easy Connect. The processing of step S216 is realized by the CPU 103 by executing the settings application to request the OS to execute Wi-Fi Easy Connect. Specifically, instead of directly executing Wi-Fi Easy Connect, the settings application requests the OS to execute Wi-Fi Easy Connect as control for executing Wi-Fi Easy Connect. Details of the processing of step S216 will be described below.

In step S217, the CPU 103 determines whether a connection is successfully established between the access point and the communication apparatus 151 by execution of Wi-Fi Easy Connect. This determination is performed based on whether execution of Wi-Fi Easy Connect is cancelled or based on information about whether a connection is successfully established with the access point that is acquired from the communication apparatus 151. In a case where the CPU 103 determines that a connection is successfully established between the access point and the communication apparatus 151 by execution of Wi-Fi Easy Connect (YES in step S217), the process ends. On the other hand, in a case where the CPU 103 determines that a connection is not successfully established between the access point and the communication apparatus 151 by execution of Wi-Fi Easy Connect (NO in step S217), the processing proceeds to step S218.

In step S218, the CPU 103 determines whether a cause of the unsuccessful establishment of a connection between the access point and the communication apparatus 151 by execution of Wi-Fi Easy Connect is a specific cause. According to the present embodiment, information about the cause of the unsuccessful establishment of a connection between the access point and the communication apparatus 151 by execution of Wi-Fi Easy Connect is acquired from the communication apparatus 151, and the determination is performed based on the acquired information. Further, according to the present embodiment, the specific cause is that, for example, a communication error occurs in Wi-Fi Easy Connect (first cause) or the encryption method used in establishing a connection between the information processing apparatus 101 and an access point is an encryption method that is not supported by the communication apparatus 151 (second cause). Further, the specific cause is that, for example, the encryption method used in establishing a connection between the information processing apparatus 101 and an access point is an encryption method that is not supported by Wi-Fi Easy Connect (third cause). A connection failure due to the second or third cause may occur in a case where Wi-Fi Easy Connect is executed after the processing proceeds from step S221 to step S216 (YES in step S221) because of the following reason. Specifically, unlike a case where Wi-Fi Easy Connect is executed after step S215, the capability information about the communication apparatus 151 is not acquired and the determinations of steps S211 and S212 are not performed in a case where Wi-Fi Easy Connect is executed after the processing proceeds from step S221 to step S216 (YES in step S221). In a case where the CPU 103 determines that the cause of the unsuccessful establishment of a connection between the access point and the communication apparatus 151 by execution of Wi-Fi Easy Connect is the specific cause (YES in step 218), the processing proceeds to step S224. On the other hand, in a case where the CPU 103 determines that the cause of the unsuccessful establishment of a connection between the access point and the communication apparatus 151 by execution of Wi-Fi Easy Connect is not the specific cause (NO in step 218), the process ends.

Steps S217 and S218 can be skipped. Specifically, for example, the process can end after step S216 without performing steps S217 and S218. Further, in a case where the CPU 103 determines that a connection is not successfully established between the access point and the communication apparatus 151 by execution of Wi-Fi Easy Connect (NO in step S217), the process can end without performing step S218.

Next, step S219 will be described below. Step S219 is performed in a case where the CPU 103 determines that the search result acquired in step S201 does not include an access point activated by the communication apparatus 151 operating in the network setup mode (NO in step S202) or a case where the CPU 103 determines that the Wi-Fi connection is not successfully established in step S203 (NO in step S204). In step S219, the CPU 103 determines whether the information processing apparatus 101 was connected to the access point via Wi-Fi when the setting operation was performed. This determination is performed based on whether information about the access point is stored in the predetermined storage area described above. In a case where the CPU 103 determines that the information processing apparatus 101 was connected to the access point via Wi-Fi when the setting operation was performed (YES in step S219), the processing proceeds to step S220. On the other hand, in a case where the CPU 103 determines that the information processing apparatus 101 was not connected to the access point via Wi-Fi when the setting operation was performed (NO in step S219), the process ends.

In step S220, the CPU 103 attempts to acquire the information relating to Wi-Fi Easy Connect using a method different from the information relating to Wi-Fi Easy Connect acquisition method in step S207. Specifically, the CPU 103 attempts to acquire the information relating to Wi-Fi Easy Connect by, for example, scanning a QR code described above. FIG. 3 illustrates an example of a screen for imaging a QR code displayed by the settings application. A screen 300 for imaging a QR code displays a frame 301. The screen 300 further displays an image being captured by the camera unit of the information processing apparatus 101. A user operates the information processing apparatus 101 so that the QR code imaged by the camera unit and displayed on the communication apparatus 151 fits in the frame 301. In a case where the QR code is detected within the frame 301, the CPU 103 analyzes the QR code and acquires the information relating to Wi-Fi Easy Connect. The acquisition of the information relating to Wi-Fi Easy Connect is not limited to the above-described form. For example, the information relating to Wi-Fi Easy Connect can be acquired from the communication apparatus 151 using NFC or Bluetooth Low Energy. In a case where the communication apparatus 151 does not support Wi-Fi Easy Connect, the communication apparatus 151 cannot display a QR code and cannot transmit the information relating to Wi-Fi Easy Connect using NFC or Bluetooth Low Energy. In this case, the CPU 103 receives a cancel operation from the user on the settings application and ends the process.

Next, in step S221, the CPU 103 determines whether the information relating to Wi-Fi Easy Connect is successfully acquired in step S220.

In a case where the CPU 103 determines that the information relating to Wi-Fi Easy Connect is successfully acquired in step S220 (YES in step S221), the processing proceeds to step S216. On the other hand, in a case where the CPU 103 determines that the information relating to Wi-Fi Easy Connect is not successfully acquired in step S220 (NO in step S221), the process ends. For example, in a case where the QR code scanned in step S220 is not a QR code for acquiring the information relating to Wi-Fi Easy Connect or the QR code is not successfully scanned, the CPU 103 determines that the information relating to Wi-Fi Easy Connect is not successfully acquired in step S220. Further, in a case where the CPU 103 determines that the information relating to Wi-Fi Easy Connect is not successfully acquired in step S220, the CPU 103 can proceed to step S224 instead of ending the process. Further, in a case where the CPU 103 determines YES in step S221, the CPU 103 can determine whether the encryption method used in establishing the connection with the connected AP is an encryption method supported by Wi-Fi Easy Connect (an encryption method supported by DPP). Then, in a case where the CPU 103 determines that the information relating to Wi-Fi Easy Connect is successfully acquired in step S220 (YES in step S221), the processing can proceed to step S216, or in a case where the CPU 103 determines that the information relating to Wi-Fi Easy Connect is not successfully acquired in step S220 (NO in step S221), the process can end or the processing can proceed to step S224. In this case, the CPU 103 recognizes the encryption methods supported by Wi-Fi Easy Connect from the information held in advance by the settings application.

Next, step S222 will be described below. Step S222 is performed in a case where the processing proceeds from step S209 to step S222 (NO in step S209). In step S222, the CPU 103 disconnects the Wi-Fi connection between the information processing apparatus 101 and the access point activated by the communication apparatus 151 operating in the network setup mode.

Next, in step S223, the CPU 103 re-establishes a connection between the information processing apparatus 101 and the access point to which the information processing apparatus 101 was connected via Wi-Fi when the setting operation was performed. Then, the processing proceeds to step S220 described above.

As described above, according to the present embodiment, in a case where the information relating to Wi-Fi Easy Connect cannot be acquired through the Wi-Fi connection between the communication apparatus 151 operating in the network setup mode and the information processing apparatus 101, an attempt to acquire the information relating to Wi-Fi Easy Connect is made using another method. Specifically, an attempt to acquire the information relating to Wi-Fi Easy Connect is made by, for example, scanning a QR code. This makes it possible to execute Wi-Fi Easy Connect even in a case where the information relating to Wi-Fi Easy Connect cannot be acquired through the Wi-Fi connection between the communication apparatus 151 operating in the network setup mode and the information processing apparatus 101.

Next, step S224 will be described below. Step S224 is performed in a case where the processing proceeds from step S206 to step S224 (NO in step S206), from step S208 to step S224 (NO in step S208), from step S212 to step S224 (NO in step S212), or from step S218 to step S224 (YES in step S218). In step S224, the CPU 103 performs a network setup of the communication apparatus 151 using a method different from Wi-Fi Easy Connect. According to the present embodiment, a method different from Wi-Fi Easy Connect is a method of performing a network setup of the communication apparatus 151 using a communication protocol for setup that is different from the protocol for Wi-Fi Easy Connect (DPP). Details of the processing will be described below. Then, the process ends.

Details of the processing in the above-described flowchart are not limited to those described above. For example, in a case where the CPU 103 cannot acquire the information relating to Wi-Fi Easy Connect through the Wi-Fi connection between the communication apparatus 151 operating in the network setup mode and the information processing apparatus 101, the process can end without an attempt to acquire the information relating to Wi-Fi Easy Connect using another method. Specific examples of a case where the information relating to Wi-Fi Easy Connect cannot be acquired through the Wi-Fi connection between the communication apparatus 151 operating in the network setup mode and the information processing apparatus 101 are a case where the CPU 103 determines that the search result acquired in step S201 does not include an access point activated by the communication apparatus 151 operating in the network setup mode (NO in step S202), a case where the CPU 103 determines that the Wi-Fi connection is not successfully established in step S203 (NO in step S204), and a case where the CPU 103 determines that the information relating to Wi-Fi Easy Connect is not successfully acquired from the communication apparatus 151 in step S207 (NO in step S209). Specifically, in a case where the CPU 103 determines NO in step S202, a case where the CPU 103 determines NO in step S204, or a case where the CPU 103 determines NO in step S209, the process can end without performing the subsequent steps (steps S219 to S223).

Further, for example, while the two determinations of steps S208 and S209 are performed after step S207, this form is not intended as a limitation. For example, instead of the two determinations of steps S208 and S209, determination of whether the information relating to Wi-Fi Easy Connect is acquired can be performed after step S207. Then, in a case where it is determined that the information relating to Wi-Fi Easy Connect is acquired, the processing proceeds to step S210, whereas in a case where it is determined that the information relating to Wi-Fi Easy Connect is not acquired, the processing proceeds to step S224, so that steps S220 to S222 are not performed.

According to the present embodiment, the encryption methods supported by the communication apparatus 151 include an encryption method supported by Wi-Fi Easy Connect. Thus, a form in which the determination of step S211 is not performed can be employed. Specifically, for example, the determination of step S212 can be performed after step S210 without performing the determination of step S211.

Further, a form in which encryption methods supported by Wi-Fi Easy Connect include an encryption method supported by the communication apparatus 151 can be employed, e.g., the communication apparatus 151 supports only WPA3 while Wi-Fi Easy Connect supports WPA2 and WPA3. In this case, a form in which the determination of step S212 is not performed can be employed. Specifically, for example, after the CPU 103 determines that the encryption method used in establishing the connection with the connected AP is an encryption method that is supported by the communication apparatus 151 (YES in step S211), the processing of step S214 can be performed without performing the determination of step S212.

The processing performed by the information processing apparatus 101 and the communication apparatus 151 in step S216 will be described below with reference to FIG. 4. A sequence illustrated in FIG. 4 is realized by, for example, the CPUs 103 and 154 of the information processing apparatus 101 and the communication apparatus 151 by reading a program stored in the ROM 104 or the external storage device 106 of the information processing apparatus 101 or the ROM 152 of the communication apparatus 151 to the RAM 105 or 153 of the information processing apparatus 101 or the communication apparatus 151 and executing the read program.

First, in step S400, the information processing apparatus 101 starts Wi-Fi Easy Connect using DPP using the function of the OS. Specifically, the information processing apparatus 101 first instructs the OS to display a Wi-Fi Easy Connect start screen from the settings application so that the Wi-Fi Easy Connect start screen is displayed. FIG. 5 illustrates an example of the Wi-Fi Easy Connect start screen. A Wi-Fi Easy Connect start screen 300 displays areas 501, 502, and 503. The area 501 is an area for changing an access point that is set as a Wi-Fi Easy Connect setting target. Before the area 501 is operated, an access point that is set as a Wi-Fi Easy Connect setting target is an access point to which the information processing apparatus 101 is currently connected. In a case where the area 501 is selected, the information processing apparatus 101 displays an access point list and sets an access point selected from the list by the user as a new Wi-Fi Easy Connect setting target. The access point list includes, for example, an access point detected through an AP search by the information processing apparatus 101 and an access point to which the information processing apparatus 101 has connected to in the past. The area 502 is an area for cancelling execution of Wi-Fi Easy Connect, and the area 503 is an area for issuing an instruction to execute Wi-Fi Easy Connect. In a case where the area 502 is operated, the information processing apparatus 101 ends the processing illustrated in the sequence diagram, and the processing proceeds to step S217. In this case, it is determined that execution of Wi-Fi Easy Connect has failed. Further, in a case where the area 503 is pressed, the processing proceeds to step S401.

In step S401, DPP Authentication processing is performed between the information processing apparatus 101 and the communication apparatus 151 using the function of the OS. In DPP Authentication, the information processing apparatus 101 and the communication apparatus 151 communicate authentication information and information for use in encrypting information to each other to authenticate communication between the information processing apparatus 101 and the communication apparatus 151. The various types of information transmitted from the information processing apparatus 101 via communication in DPP Authentication are encrypted based on the information relating to Wi-Fi Easy Connect acquired by the information processing apparatus 101 in the process illustrated in FIG. 2. In a case where the communication apparatus 151 successfully decrypts the information received from the information processing apparatus 101 using a decryption key stored in advance, the communication apparatus 151 authenticates the communication with the information processing apparatus 101. In a case where the information processing apparatus 101 fails to acquire correct information relating to Wi-Fi Easy Connect and thus fails to encrypt the information correctly, the communication apparatus 151 fails to decrypt the information, so that the authentication fails. Further, in DPP Authentication, communication is performed using DPP.

Next, in step S402, DPP Configuration processing is performed between the information processing apparatus 101 and the communication apparatus 151 using the function of the OS. In DPP Configuration, the information processing apparatus 101 transmits connection information to the communication apparatus 151 using Wi-Fi Easy Connect. The connection information is information for connecting to an access point that is set as a Wi-Fi Easy Connect setting target. The connection information includes an SSID and password of the access point set as a Wi-Fi Easy Connect setting target and information indicating an encryption method. The password transmitted at this time is information that is input by the user on a screen displayed by an application supported by the OS in establishing a connection between the information processing apparatus 101 and the access point.

Further, the password is information that is held by the OS in a case where a connection is established between the information processing apparatus 101 and the access point. Further, the password is information that is not held by the settings application.

Further, the password transmitted at this time is information that is held in advance by the OS, so that the user does not have to input the password on the screen displayed by the settings application. According to the present embodiment, the connection information is transmitted using Wi-Fi Easy Connect so that the password is transmitted to the communication apparatus 151 via secure communication without receiving new input of the password from the user on the screen displayed by the settings application. In DPP Configuration, communication is performed using DPP.

In step S403, the communication apparatus 151 ends the network setup mode and changes to the infrastructure mode. Then, the communication apparatus 151 attempts to establish a connection with the access point corresponding to the connection information acquired through Wi-Fi Easy Connect using the acquired connection information. In a case where the connection is successfully established, the communication apparatus 151 can thereafter perform communication via a network formed by the connected access point. Communication via the network formed by the connected access point is performed using a protocol different from DPP (specific examples of a protocol different from DPP are Port 9100, Simple Network Management Protocol (SNMP), and a protocol specific to the vendor of the communication apparatus 151). The communication apparatus 151 can transmit information about whether a connection is successfully established with the access point corresponding to the connection information acquired through Wi-Fi Easy Connect to the information processing apparatus 101. Further, in a case where the communication apparatus 151 fails to establish a connection with the access point corresponding to the connection information acquired through Wi-Fi Easy Connect, the communication apparatus 151 can transmit information indicating a cause of the failure to the information processing apparatus 101. Further, transmission of the foregoing information can be performed using DPP. A cause of a failure to establish a connection with the access point corresponding to the connection information acquired through Wi-Fi Easy Connect is a communication error in Wi-Fi Easy Connect, a failure to detect the access point, or incorrect information relating to Wi-Fi Easy Connect that is acquired from the communication apparatus 151. Another example is that the encryption method used in establishing the connection with the access point that is set as a Wi-Fi Easy Connect setting target is an encryption method that is not supported by the communication apparatus 151. Yet another example is that the encryption method used in establishing the connection with the access point that is set as a Wi-Fi Easy Connect setting target is an encryption method that is not supported by Wi-Fi Easy Connect.

In step S404, the information processing apparatus 101 searches for the communication apparatus 151 on the network to which the information processing apparatus 101 belongs. This processing is realized by the settings application having received a notification of completion of execution of Wi-Fi Easy Connect from the OS. Then, in a case where the communication apparatus 151 is detected, the information processing apparatus 101 transmits a request for capability information to the communication apparatus 151, and the communication apparatus 151 transmits the capability information to the information processing apparatus 101. This registers the information about the communication apparatus 151 on the settings application, and the settings application can thereafter communicate with the communication apparatus 151. Specifically, for example, the settings application can transmit a print job to the communication apparatus 151. At this time, in a case where the information processing apparatus 101 belongs to a network formed by an access point to which the communication apparatus 151 is connected through Wi-Fi Easy Connect, the information processing apparatus 101 can communicate with the communication apparatus 151 via the access point. Further, in a case where the information processing apparatus 101 and the communication apparatus 151 cannot communicate with each other because an access point to which the communication apparatus 151 is connected is not an access point to which the information processing apparatus 101 is connected, the capability information request and the capability information acquisition are skipped. The communication in step S404 is performed using a communication protocol (e.g., Canon Hyper Text Transfer Protocol Management Protocol (Canon HTTP Management Protocol (CHMP))) different from DPP and the communication protocol for setup. Thereafter, the information processing apparatus 101 ends the process illustrated in the sequence diagram, and the processing proceeds to step S217.

Next, the processing performed by the information processing apparatus 101 and the communication apparatus 151 in step S224 will be described below with reference to FIG. 6. A sequence illustrated in FIG. 6 is realized by, for example, the CPUs 103 and 154 of the information processing apparatus 101 and the communication apparatus 151 by reading a program stored in the ROM 104 or the external storage device 106 of the information processing apparatus 101 or the ROM 152 of the communication apparatus 151 to the RAM 105 or 153 of the information processing apparatus 101 or the communication apparatus 151 and executing the read program. As described above, the communication protocol for setup is used in communication performed via the Wi-Fi connection between the communication apparatus 151 operating in the network setup mode and the information processing apparatus 101.

In step S600, the settings application of the information processing apparatus 101 transmits a request for an access point list to the communication apparatus 151 via the Wi-Fi connection between the communication apparatus 151 operating in the network setup mode and the information processing apparatus 101.

Next, in step S601, the communication apparatus 151 transmits the access point list to the information processing apparatus 101 via the Wi-Fi connection between the communication apparatus 151 operating in the network setup mode and the information processing apparatus 101. The list transmitted herein is a list specifying one or more access points that are detected through an AP search by the communication apparatus 151 and to which the communication apparatus 151 can be connected.

Next, in step S602, the information processing apparatus 101 transmits connection information about an access point included in the received list to the communication apparatus 151 via the Wi-Fi connection between the communication apparatus 151 operating in the network setup mode and the information processing apparatus 101.

This processing is realized by the settings application by controlling the information processing apparatus 101 to transmit connection information about an access point included in the received list. Specifically, in a case where the received list includes the connected AP, the information processing apparatus 101 transmits connection information about the connected AP in the processing. According to the present embodiment, the list includes only an access point to which the communication apparatus 151 can be connected, so that a case where the received list includes the connected AP is a case where the communication apparatus 151 can be connected to the connected AP. Further, in a case where the received list does not include the connected AP, the information processing apparatus 101 displays the received list to receive an access point selected from the list by the user.

Then, the information processing apparatus 101 transmits connection information about the selected access point. According to the present embodiment, the list includes only an access point to which the communication apparatus 151 can be connected, so that a case where the received list does not include the connected AP is a case where the communication apparatus 151 cannot be connected to the connected AP. Further, the list does not include access points connectable by an encryption method that is not supported by the communication apparatus 151 because the communication apparatus 151 cannot be connected to the access points. Further, the list does not include access points connectable through a frequency band that is not supported by the communication apparatus 151 because the communication apparatus 151 cannot be connected to the access points. Thus, in step S224 performed in a case where the CPU 103 determines that the encryption method used in establishing the connection with the connected AP is an encryption method that is not supported by the communication apparatus 151 (NO in step S211) or a case where the CPU 103 determines that the frequency band used in establishing the connection with the connected AP is not a frequency band supported by the communication apparatus 151 (NO in step S213), connection information about an access point different from the connected AP is transmitted. In a case where the CPU 103 determines that the encryption method used in establishing the connection with the connected AP is not an encryption method supported by Wi-Fi Easy Connect (NO in step S212), there may be a case where the connected AP and the communication apparatus 151 can be connected to each other, so that the connection information about the connected AP can be transmitted or connection information about an access point different from the connected AP can be transmitted. The above-described form is not intended as a limitation, and the list can be displayed each time to receive selection of an access point from the user each time. Before the connection information is transmitted, the information processing apparatus 101 receives input of the password for connecting to the access point from the user on the screen displayed by the settings application. Then, the received password is included in the connection information, and the connection information including the password therein is transmitted.

In step S603, the communication apparatus 151 transmits a notification of receipt of the connection information to the information processing apparatus 101 via the Wi-Fi connection between the communication apparatus 151 operating in the network setup mode and the information processing apparatus 101.

In step S604, the communication apparatus 151 ends the network setup mode and changes to the infrastructure mode. Then, the communication apparatus 151 attempts to establish a connection with the access point corresponding to the connection information acquired in step S602 using the connection information. In a case where the connection is successfully established, the communication apparatus 151 thereafter can communicate via the network formed by the connected access point.

In step S605, the settings application of the information processing apparatus 101 re-connects to the access point to which the information processing apparatus 101 was connected when the setting operation was performed using the stored connection information. This form is not intended as a limitation. For example, in a case where the connection information transmitted to the communication apparatus 151 from the information processing apparatus 101 is connection information about another access point different from the access point to which the information processing apparatus 101 was connected via Wi-Fi when the setting operation was performed, the information processing apparatus 101 can connect to the other access point.

In step S606, the settings application of the information processing apparatus 101 searches for the communication apparatus 151 on the network to which the information processing apparatus 101 belongs. Then, in a case where the communication apparatus 151 is detected, the information processing apparatus 101 transmits a request for capability information to the communication apparatus 151, and the communication apparatus 151 transmits capability information to the information processing apparatus 101. This registers the information about the communication apparatus 151 on the settings application, and the settings application can thereafter communicate with the communication apparatus 151. Specifically, for example, the settings application can transmit a print job to the communication apparatus 151. At this time, in a case where the information processing apparatus 101 belongs to a network formed by an access point to which the communication apparatus 151 is connected through the network setup, the information processing apparatus 101 can communicate with the communication apparatus 151 via the access point. Further, in a case where the information processing apparatus 101 and the communication apparatus 151 cannot communicate with each other because an access point to which the communication apparatus 151 is connected is not an access point to which the information processing apparatus 101 is connected, the capability information request and the capability information acquisition are skipped. The communication in step S606 is performed using a communication protocol (e.g., CHMP) different from DPP and the communication protocol for setup. Thereafter, the information processing apparatus 101 ends the process illustrated in the sequence diagram.

Details of the processing in the above-described sequence diagram are not limited to those described above. For example, in a case where the received list does not include the access point to which the information processing apparatus 101 was connected via Wi-Fi when the setting operation was performed, the transmission of connection information about an access point and an attempt to establish a connection between the communication apparatus 151 and the access point do not have to be performed.

Then, the connection information about the access point activated in the communication apparatus 151 during the AP mode can be received from the communication apparatus 151, and an attempt to establish a connection between the communication apparatus 151 operating in the AP mode and the information processing apparatus 101 can be made. In a case where the above-described form is employed, the communication apparatus 151 transmits the connection information about the access point activated in the communication apparatus 151 during the AP mode and thereafter ends the network setup mode and changes to the AP mode.

As described above, according to the present embodiment, in a case where the communication apparatus 151 can connect to a predetermined access point that is a setting target, the information processing apparatus 101 is controlled to transmit connection information about the predetermined access point to the communication apparatus 151 using Wi-Fi Easy Connect. Further, in a case where the communication apparatus 151 cannot connect to a predetermined access point that is a setting target, the information processing apparatus 101 is controlled to transmit connection information about an access point different from the predetermined access point to the communication apparatus 151 using the network setup. Examples of a case where the communication apparatus 151 can connect to a predetermined access point is a case where the communication apparatus 151 supports an encryption method used in establishing a connection with the predetermined access point and a case where the communication apparatus 151 supports a frequency band used in establishing a connection with the predetermined access point. Further, examples of a case where the communication apparatus 151 cannot connect to a predetermined access point are a case where the communication apparatus 151 does not support an encryption method used in establishing a connection with the predetermined access point and a case where the communication apparatus 151 does not support a frequency band used in establishing a connection with the predetermined access point. According to the present embodiment, in a case where the communication apparatus 151 can connect to a predetermined access point but Wi-Fi Easy Connect does not support an encryption method used in establishing a connection with the predetermined access point, the information processing apparatus 101 is controlled to transmit connection information about an access point different from the predetermined access point to the communication apparatus 151 using the network setup.

With the above-described form, in a case where a connection between a predetermined access point and the communication apparatus 151 can be established using Wi-Fi Easy Connect, the setup is performed using Wi-Fi Easy Connect to realize simplified setup without requesting the user to input the password. Further, in a case where a connection between a predetermined access point and the communication apparatus 151 cannot be established using Wi-Fi Easy Connect, the setup is performed using a function different from Wi-Fi Easy Connect to ensure that a connection is established between the access point and the communication apparatus 151.

Another form of a technical solution according to the present invention that is different from the first embodiment will be described below.

According to a second embodiment, Wi-Fi Easy Connect is executed without executing the determination of whether a connection between the connected AP and the communication apparatus 151 can be established using Wi-Fi Easy Connect as in steps S211 to S213 according to the first embodiment. Then, in a case where the execution of Wi-Fi Easy Connect fails, the network setup using a protocol different from DPP is performed. With the above-described form, in a case where a connection is not successfully established using Wi-Fi Easy Connect, the execution of Wi-Fi Easy Connect is wasted, but the subsequent network setup ensures establishment of a connection between the access point and the communication apparatus 151. Further, in a case where a connection is successfully established using Wi-Fi Easy Connect, the setup is realized through fewer steps of processing than the first embodiment.

Unless otherwise specified, a communication system according to the present embodiment is similar to that according to the first embodiment.

Figure 7A:
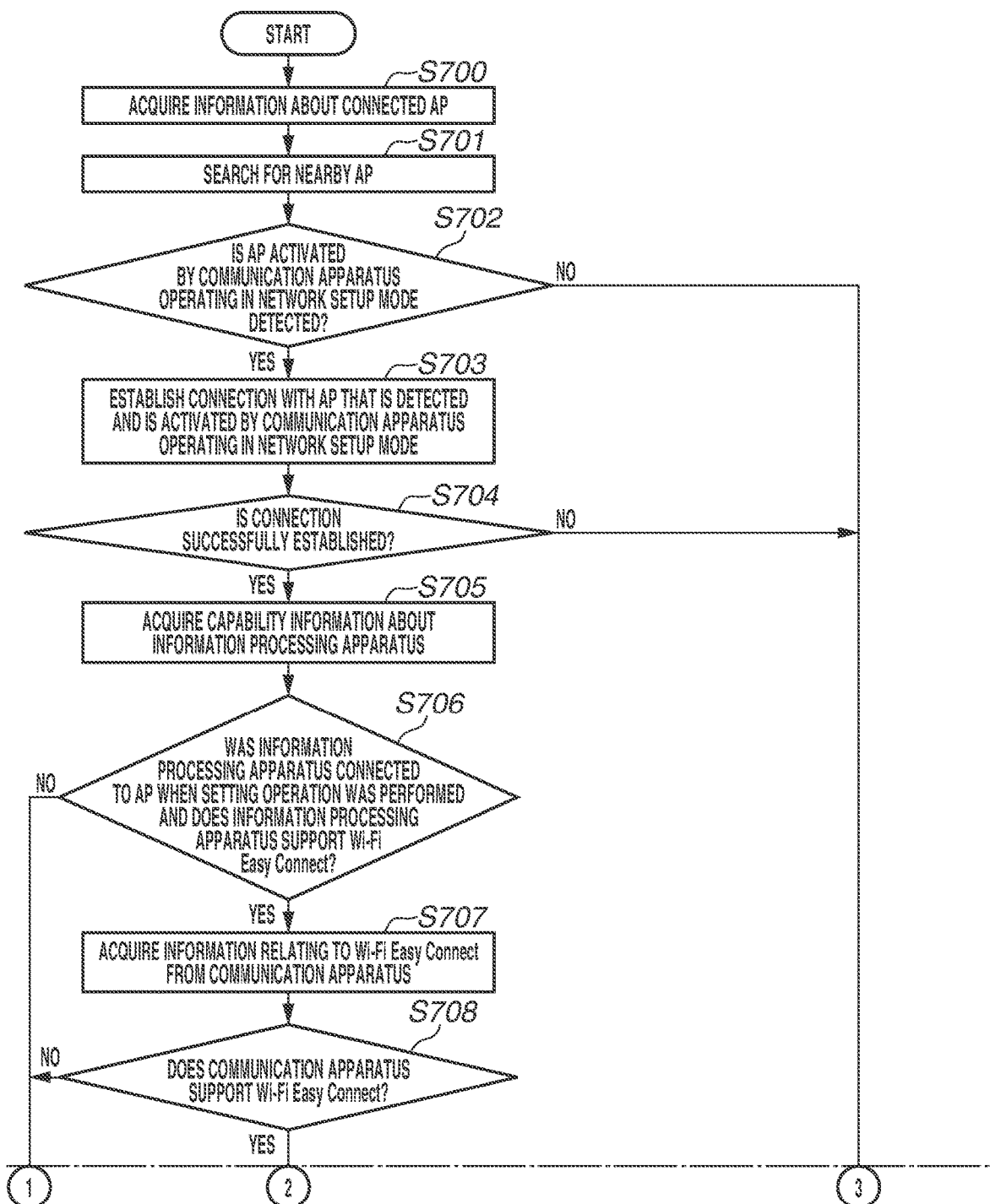

FIG. 7 is a flowchart illustrating a process that is performed by the information processing apparatus 101 in network setup processing according to the present embodiment. The flowchart illustrated in FIG. 7 is realized by, for example, the CPU 103 by reading the settings application stored in the ROM 104 or the external storage device 106 to the RAM 105 and executing the read settings application. Further, the flowchart illustrated in FIG. 7 is started in a case where the setting operation is performed on the screen displayed by the settings application.

Steps S701 to S709 are similar to steps S201 to S209. Further, steps S710 to S713 are similar to steps S214 to S217. Further, step S714 is similar to step S224. Further, steps S715 to S719 are similar to steps S219 to S223.

As described above, according to the present embodiment, the determination corresponding to steps S211 to S213 is not performed. Thus, an attempt to execute Wi-Fi Easy Connect is made in a case where the communication apparatus 151 does not support the encryption method used in establishing a connection with the connected AP, a case where the communication apparatus 151 does not support the frequency band used in establishing a connection with the connected AP, or a case where Wi-Fi Easy Connect does not support the encryption method used in establishing a connection with the connected AP. In these cases, an attempt to execute Wi-Fi Easy Connect does not result in successful establishment of a connection between the connected AP and the communication apparatus 151 by execution of Wi-Fi Easy Connect. Thus, in step S713, the CPU 103 determines that a connection is not successfully established between the access point and the communication apparatus 151 by execution of Wi-Fi Easy Connect (NO in step S713), and the network setup is performed in step S714.

In a case where the CPU 103 cannot acquire the information relating to Wi-Fi Easy Connect via the Wi-Fi connection between the communication apparatus 151 operating in the network setup mode and the information processing apparatus 101, the CPU 103 can end the process without attempting to acquire the information relating to Wi-Fi Easy Connect using another method. This point is the same as that in the first embodiment. Further, for example, after step S707, instead of the two determinations in steps S708 and S709, a determination of whether the information relating to Wi-Fi Easy Connect is acquired can be performed. Then, the processing can proceed to step S710 in a case where it is determined that the information relating to Wi-Fi Easy Connect is acquired, or the processing can proceed to step S714 in a case where it is determined that the information relating to Wi-Fi Easy Connect is not acquired.

OTHER EMBODIMENTS

According to the above-described embodiments, the connection information about the connected AP is transmitted using Wi-Fi Easy Connect, and the various determinations in steps S211 to S213 are performed on the connected AP. The above-described forms are not intended as a limitation. Connection information about an access point different from the connected AP can be transmitted, and the determinations on an access point different from the connected AP can be performed. Specifically, an example of an access point different from the connected AP is an AP to which the information processing apparatus 101 was not connected when the setting operation was performed but the information processing apparatus 101 had been connected at a timing before the setting operation was performed. Further, an access point different from the connected AP can be an access point selected by the user from a list of access points to which the information processing apparatus 101 was connected. This is because connection information about an access point to which the information processing apparatus 101 was connected at a timing and that is stored in the OS can be transmitted using Wi-Fi Easy Connect.

The forms in which connection information is transmitted via the Wi-Fi connection between the information processing apparatus 101 and the communication apparatus 151 in the network setup in step S224 or S714 are described above. The above-described forms are not intended as a limitation. For example, connection information can be transmitted via a connection established between the information processing apparatus 101 and the communication apparatus 151 using a communication method other than Wi-Fi, such as Bluetooth Low Energy, in the network setup. In a case where this form is employed, the information processing apparatus 101 can connect to the communication apparatus 151 using Bluetooth Low Energy while maintaining the Wi-Fi connection to the connected AP. Specifically, connection information about the currently-connected access point can be transmitted as the connection information about the connected AP. In this form, a communication protocol different from DPP is used.

In the above-described forms according to the above-described embodiments, various types of information are acquired via the Wi-Fi connection between the information processing apparatus 101 and the access point activated by the communication apparatus 151 operating in the network setup mode in steps S207 and S707. The above-described forms are not intended as a limitation. Various types of information can be acquired by scanning a QR code as in step S220 or can be acquired via communication using another communication method such as NFC or Bluetooth Low Energy.

Further, while DPP is used in the above-described forms, the above-described forms are not intended as a limitation. Another protocol different from the communication protocol for setup can be used in place of DPP. Specifically, for example, HTTP can be used.

The above-described embodiments are also realized by executing the following processing. Specifically, software (program) for realizing functions according to the above-described embodiment is provided to a system or an apparatus via a network or a storage medium, and a computer (CPU, micro-processing unit (MPU)) of the system or the apparatus reads the program and executes the read program. Further, the program can be executed by a single computer, or a plurality of computers can cooperate together to execute the program. Further, the processing described above does not have to be realized entirely by the software and can be realized partly or entirely by hardware such as an application-specific integrated circuit (ASIC). Further, the CPU is not limited to a single CPU configured to perform the entire processing, and a plurality of CPUs can cooperate together as needed to perform the processing.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like. While the present invention has been described with reference to embodiments, it is to be understood that the invention is not limited to the disclosed embodiments. The scope of the following claims is to be accorded the broadest interpretation so as to encompass all such modifications and equivalent structures and functions.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2021-030362, filed Feb. 26, 2021, which is hereby incorporated by reference herein in its entirety.

What is claimed is:

1. An information processing apparatus comprising:
an acquisition unit configured to acquire, via communication with a communication apparatus based on Institute of Electrical and Electronics Engineers (IEEE) 802.11 using a first protocol, predetermined information for performing communication with the communication apparatus based on IEEE 802.11 using a second protocol;
a determination unit configured to perform determination processing about whether to perform a predetermined control; and
a control unit configured to perform the predetermined control to control the information processing apparatus to transmit connection information for connecting to an access point to the communication apparatus via communication with the communication apparatus, the communication being performed using the predetermined information based on IEEE 802.11 using the second protocol,
wherein whether to perform the predetermined control is controlled based on a result of the determination processing,
wherein the predetermined control transmits connection information for connecting to a first access point, and
wherein the determination processing includes at least one of (i) a process of determining whether an encryption method for use in establishing a connection with the first access point is an encryption method that is supported by the communication apparatus, (ii) a process of determining whether a frequency band for use in establishing a connection with the first access point is a frequency band that is supported by the communication apparatus or (iii) a process of determining whether an encryption method for use in establishing a connection with the first access point is an encryption method that is supported by the second protocol.

2. The information processing apparatus according to claim 1, further comprising a performing unit configured to perform, in a case that the determination processing has determined that the predetermined control is not performed, specific control to transmit the connection information for connecting to an access point to the communication apparatus via the communication with the communication apparatus based on IEEE 802.11 using the first protocol.

3. The information processing apparatus according to claim 2,
wherein the specific control transmits connection information for connecting to a second access point different from the first access point.

4. The information processing apparatus according to claim 3,
wherein the determination processing includes (i) the process of determining whether the encryption method for use in establishing the connection with the first access point is the encryption method that is supported by the communication apparatus, and
wherein the predetermined control is performed in a case where it is determined that the encryption method for use in establishing the connection with the first access point is the encryption method that is supported by the communication apparatus, whereas the specific control is performed in a case where it is determined that the encryption method for use in establishing the connection with the first access point is not the encryption method that is supported by the communication apparatus.

5. The information processing apparatus according to claim 3,
wherein the determination processing includes (ii) the process of determining whether the frequency band for use in establishing the connection with the first access point is the frequency band that is supported by the communication apparatus, and
wherein the predetermined control is performed in a case where it is determined that the frequency band for use in establishing the connection with the first access point is the frequency band that is supported by the communication apparatus, whereas the specific control is performed in a case where it is determined that the frequency band for use in establishing the connection with the first access point is not the frequency band that is supported by the communication apparatus.

6. The information processing apparatus according to claim 3,
wherein the determination processing includes (iii) the process of determining whether the encryption method for use in establishing the connection with the first access point is the encryption method that is supported by the second protocol, and
wherein the predetermined control is performed in a case where it is determined that the encryption method for use in establishing the connection with the first access point is the encryption method that is supported by the second protocol, whereas the specific control or third control to control the information processing apparatus to transmit the connection information for connecting to the first access point to the communication apparatus via the communication with the communication apparatus using the first protocol is performed in a case where it is determined that the encryption method for use in establishing the connection with the first access point is not the encryption method that is supported by the second protocol.

7. The information processing apparatus according to claim 3, further comprising a second acquisition unit configured to acquire information for use in the determination processing from the communication apparatus via the communication with the communication apparatus based on IEEE 802.11 using the first protocol.

8. The information processing apparatus according to claim 3,
wherein a frequency band for use in establishing a connection with the first access point is a 2.4-GHz frequency band or a 5-GHz frequency band, and
wherein a frequency band that is supported by the communication apparatus is both the 2.4-GHz frequency band and the 5-GHz frequency band or only the 2.4-GHz frequency band.

9. The information processing apparatus according to claim 3, wherein an encryption method for use in establishing a connection with the first access point is Wi-Fi Protected Access (WPA), Wi-Fi Protected Access 2 (WPA2), Wi-Fi Protected Access 3 (WPA3), or Wired Equivalent Privacy (WEP).

10. The information processing apparatus according to claim 3, wherein an encryption method that is supported by the communication apparatus is WPA, WPA2, and WPA3, and an encryption method that is not supported by the communication apparatus is WEP.

11. The information processing apparatus according to claim 3, wherein an encryption method that is supported by the second protocol is WPA2 and WPA3, and an encryption method that is not supported by the second protocol is WPA and WEP.

12. The information processing apparatus according to claim 1,
wherein the information processing apparatus includes a predetermined application program, and
wherein the connection information for connecting to the first access point including a password for connecting to the first access point is transmitted to the communication apparatus by the predetermined control via the communication with the communication apparatus using the second protocol without receipt of user input of the password on a screen displayed by the predetermined application program.

13. The information processing apparatus according to claim 1, wherein the second protocol is Device Provisioning Protocol.

14. The information processing apparatus according to claim 13, wherein the predetermined control is control to request an operating system of the information processing apparatus to execute a function of transmitting the connection information for connecting to the first access point to the communication apparatus via communication with the communication apparatus using Device Provisioning Protocol.

15. The information processing apparatus according to claim 1, wherein the second protocol is Hyper Text Transfer Protocol.

16. The information processing apparatus according to claim 1, wherein the first protocol is Simple Network Management Protocol.

17. The information processing apparatus according to claim 1, further comprising a transmitting unit configured to transmit a print job of causing the communication apparatus to perform printing via an access point to which the communication apparatus is connected by the predetermined control.

18. The information processing apparatus according to claim 17, wherein the print job is transmitted using a protocol different from the second protocol.

19. A method for controlling an information processing apparatus, the method comprising:
acquiring, via communication with a communication apparatus based on Institute of Electrical and Electronics Engineers (IEEE) 802.11 using a first protocol, predetermined information for performing communication with the communication apparatus based on IEEE 802.11 using a second protocol;
performing determination processing about whether to perform a predetermined control; and
performing the predetermined control to control the information processing apparatus to transmit connection information for connecting to a first access point to the communication apparatus via the communication with the communication apparatus, the communication being performed using the predetermined information based on IEEE 802.11 using the second protocol,
wherein whether to perform the predetermined control is controlled based on a result of the determination processing,
wherein the predetermined control transmits connection information for connecting to a first access point, and
wherein the determination processing includes at least one of (i) a process of determining whether an encryption method for use in establishing a connection with the first access point is an encryption method that is supported by the communication apparatus, (ii) a process of determining whether a frequency band for use in establishing a connection with the first access point is a frequency band that is supported by the communication apparatus or (iii) a process of determining whether an encryption method for use in establishing a connection with the first access point is an encryption method that is supported by the second protocol.

20. A non-transitory computer-readable storage medium storing a program for causing a computer of an information processing apparatus to perform:
acquiring, via communication with a communication apparatus based on Institute of Electrical and Electronics Engineers (IEEE) 802.11 using a first protocol, predetermined information for performing communication with the communication apparatus based on IEEE 802.11 using a second protocol; and
performing determination processing about whether to perform a predetermined control; and
performing the predetermined control to control the information processing apparatus to transmit connection information for connecting to a first access point to the communication apparatus via communication with the communication apparatus that is performed using the predetermined information based on IEEE 802.11 using the second protocol,
wherein whether to perform the predetermined control is controlled based on a result of the determination processing,
wherein the predetermined control transmits connection information for connecting to a first access point, and
wherein the determination processing includes at least one of (i) a process of determining whether an encryption method for use in establishing a connection with the first access point is an encryption method that is supported by the communication apparatus, (ii) a process of determining whether a frequency band for use in establishing a connection with the first access point is a frequency band that is supported by the communication apparatus or (iii) a process of determining whether an encryption method for use in establishing a connection with the first access point is an encryption method that is supported by the second protocol.

* * * * *